US009961994B2

(12) United States Patent
Rivera

(10) Patent No.: US 9,961,994 B2
(45) Date of Patent: May 8, 2018

(54) COFFEE MAKER STAND WITH DRAWER

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 0 days. days.

(21) Appl. No.: 15/061,716

(22) Filed: Mar. 4, 2016

(65) Prior Publication Data

US 2017/0251809 A1 Sep. 7, 2017

(51) Int. Cl.

| | |
|---|---|
| ***A47B 81/00*** | (2006.01) |
| ***A47B 37/00*** | (2006.01) |
| ***A47B 88/04*** | (2006.01) |
| ***A47B 95/02*** | (2006.01) |

(52) U.S. Cl.

CPC .............. *A47B 37/00* (2013.01); *A47B 81/00* (2013.01); *A47B 88/0411* (2013.01); *A47B 88/0477* (2013.01); *A47B 95/02* (2013.01); *A47B 2095/024* (2013.01)

(58) Field of Classification Search

CPC ..... A47B 37/00; A47B 81/00; A47B 88/0411; A47B 88/0418; A47B 88/0466; A47B 88/0477; A47B 95/02

USPC .......... 312/257.1, 294, 330.1, 334.1, 334.27, 312/351.1, 351.11; D7/600.1; 211/71.01, 211/74, 79, 80, 81; 248/133, 676, 678

See application file for complete search history.

(56) References Cited

U.S. PATENT DOCUMENTS 4,192,564 A * 3/1980 Losert ................... D06F 39/125 248/188.3
5,785,293 A * 7/1998 Ford ........................ F16M 3/00 248/649
5,868,478 A * 2/1999 Yemini .................. A47B 95/02 292/107
D628,445 S * 12/2010 Snider ......................... D7/600.1
8,974,014 B1 * 3/2015 Tiemann ................ A47B 88/20 211/71.01
D743,748 S * 11/2015 Tiemann ..................... D7/600.1
D750,442 S * 3/2016 Tiemann ..................... D7/600.1
2013/0193825 A1 * 8/2013 Betesh .................. A47B 88/04 312/400
2014/0048538 A1 * 2/2014 Sabounjian ............... B65B 5/08 220/486

OTHER PUBLICATIONS

Kuerig K Cup Drawer—60/202875-000, dated Oct. 2014.

* cited by examiner

*Primary Examiner* — James O Hansen

(74) *Attorney, Agent, or Firm* — Kenneth L. Green; Averill & Green

(57) ABSTRACT

A coffee maker stand includes a drawer for brewing cartridges and a two position latch or handle. The latch or handle has a first position locking the drawer into the stand and extending rollers under the stand allowing easy movement of the stand, and second position retracing the rollers to resist moving the stand and releasing the drawer.

20 Claims, 7 Drawing Sheets

COFFEE MAKER STAND WITH DRAWER

BACKGROUND OF THE INVENTION

The present invention relates to coffee maker stands and in particular to a coffee maker stand have rollers for easy moving and a drawer.

Coffee makers are often located on counter tops under kitchen cabinets. There is often a desire to move the coffee maker out from under the cabinet for use, and to return the coffee maker to a position under the cabinet to make more counter space available. There is a further need for storage of brewing cartridges. Known coffee maker stands either resist relocation, or may be unintentionally moved.

BRIEF SUMMARY OF THE INVENTION

The present invention addresses the above and other needs by providing a coffee maker stand including a drawer for brewing cartridges and a two position latch or handle. The latch or handle has a first position locking the drawer into the stand and extending rollers under the stand allowing easy movement of the stand, and second position retracing the rollers to resist moving the stand and releasing the drawer.

In accordance with one aspect of the invention, there is provided a coffee maker stand with a vertically sliding handle. In a down position the handle pushes vertical arms against a roller assembly to lift the stand to be supported by rollers residing against a supporting surface. The rollers can be spherical rollers, casters, or wheels. When the rollers support the stand, the stand is easily moved to relocate the coffee maker. In an up position of the handle, the roller assembly moves up away from the supporting surface and the stand is supported by pads resisting movement.

In accordance with another aspect of the invention, there is provided a coffee maker stand with a horizontally sliding latch. The latch cooperates with a cam inside the drawer. The cam is pivoted by the latch to extend down against the roller assembly to lift the stand to be supported by the rollers residing against the supporting surface.

In accordance with yet another aspect of the invention, there is provided a coffee maker stand which locks the draw when the stand is supported by rollers, so that a user can use the drawer handle to move the stand without withdrawing the drawer from the stand. The locking function is coupled with the roller assembly so that the draw may be removed when the roller assembly is not supporting the stand (i.e., the stand resists movement), and the draw is locked to the stand when the roller assembly is supporting the stand allowing movement.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
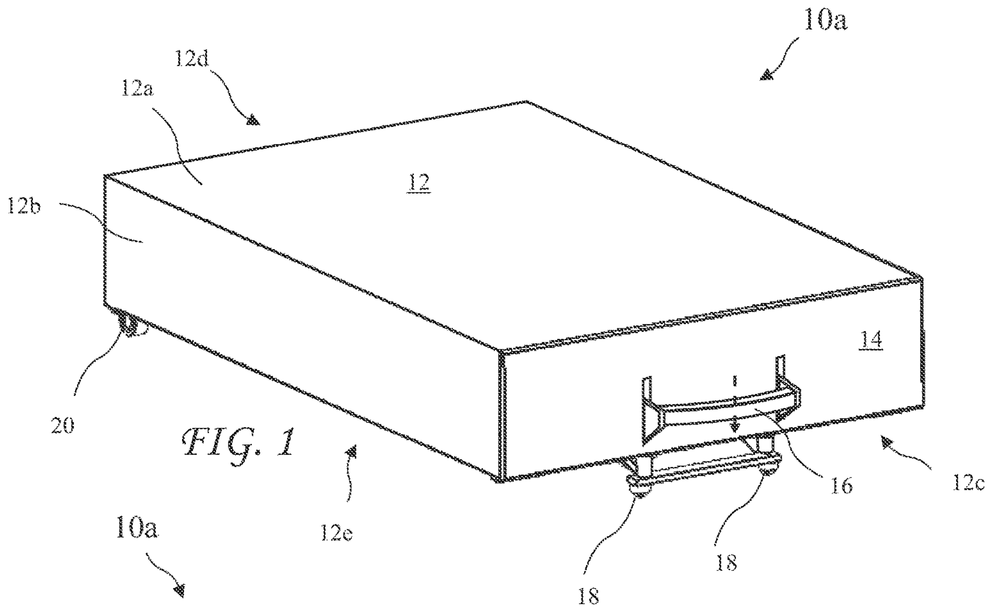
FIG. 1 shows a perspective view of a first coffee maker stand with a drawer closed, according to the present invention.
Figure 2:
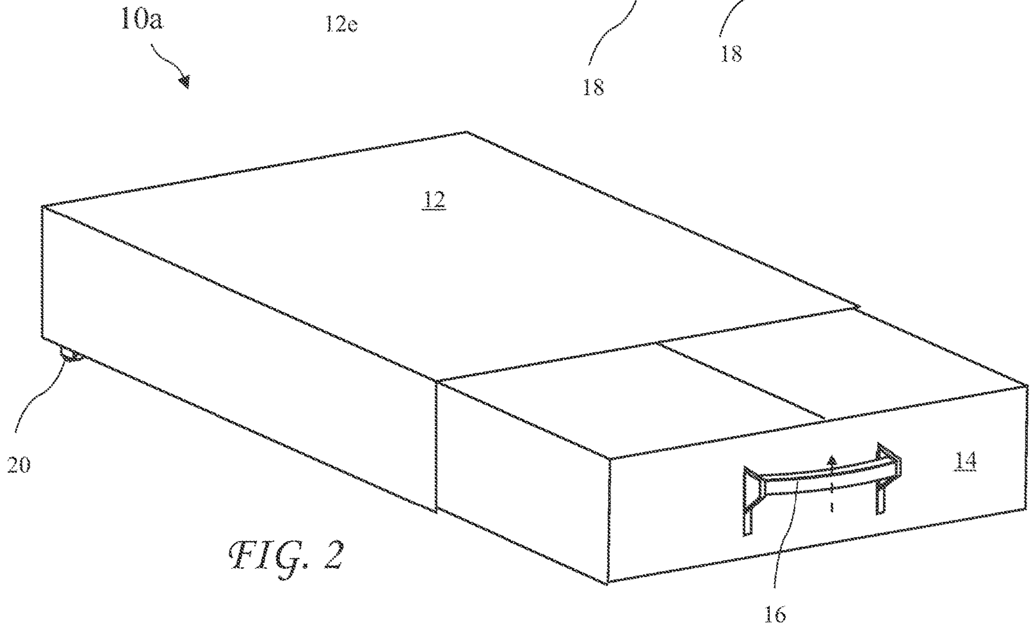
FIG. 2 shows a perspective view of the first coffee maker stand with the drawer open according to the present invention.
Figure 3:
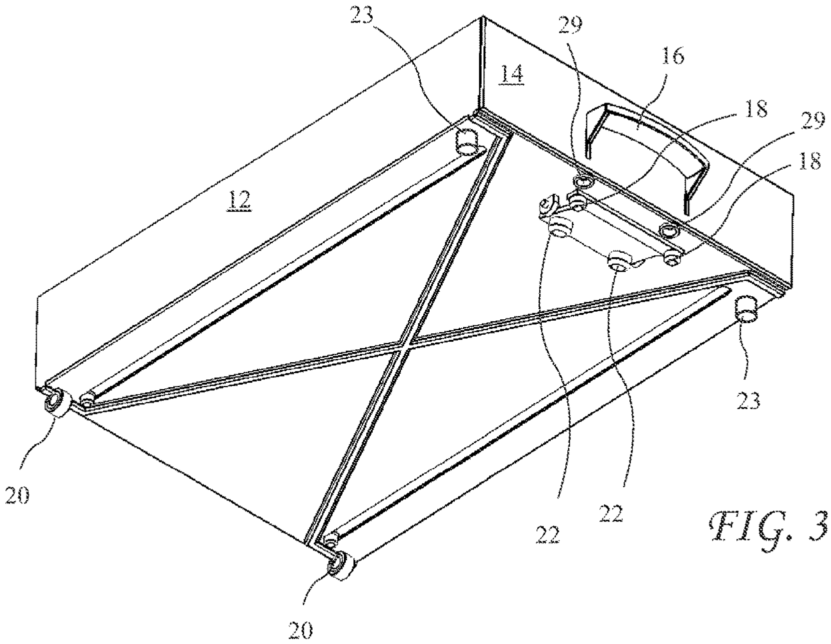
FIG. 3 shows a bottom perspective view of the first coffee maker stand with the drawer closed, according to the present invention.

A perspective view of a first coffee maker stand 10 with a drawer 14 closed is shown in FIG. 1, a perspective view of the first coffee maker stand 10 with the drawer 14 open is shown in FIG. 2, and a bottom perspective view of the first coffee maker stand 10 with the drawer 14 closed is shown in FIG. 3. A roller assembly 26 (see FIGS. 5A-6C) including two laterally spaced apart rollers 18 is attached to the housing 12 proximal to a housing front 12*c* and two laterally spaced apart rear rollers 20 are attached to a housing bottom 12*e* proximal to a housing rear 12*d* and housing sides 12*b*. A vertically moving handle 16 is attached to the drawer 14 and cooperates with the roller assembly 26 to push the rollers 18 down to support the stand 10.

The rollers 18 and rear rollers 20 may be wheels, ball rollers, or casters, and the rollers 18 are preferably ball rollers and the rear rollers 20 are preferably wheels. The roller assembly 26 further includes two laterally spaced apart pads 22 which support the front of the stand 10 when the roller assembly 26 is pivoted up. Support feet 23 reside on the housing bottom 12*e* proximal to the housing front 12*c* and housing sides 12*b*. When the roller assembly 26 is pivoted up to lift the rollers 18, the stand 10 is supported by the rear rollers 20 and the support feet 23.

Figure 4B:
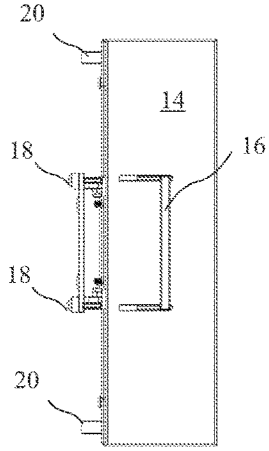
FIG. 4B shows a front view of the first coffee maker stand invention with the drawer closed, according to the present.
Figure 4A:
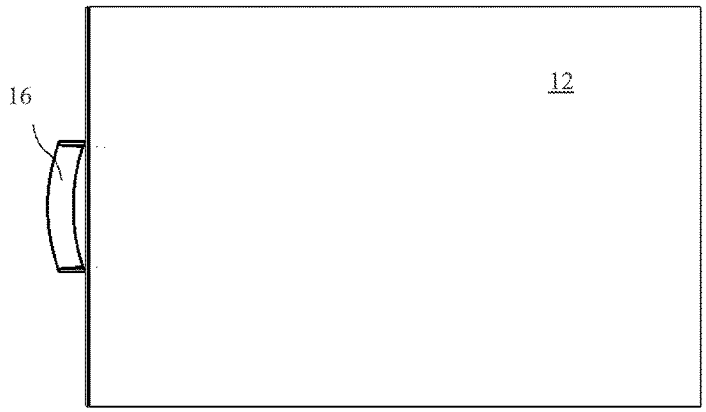
FIG. 4A shows a top view of the first coffee maker stand invention with the drawer closed, according to the present.
Figure 4C:
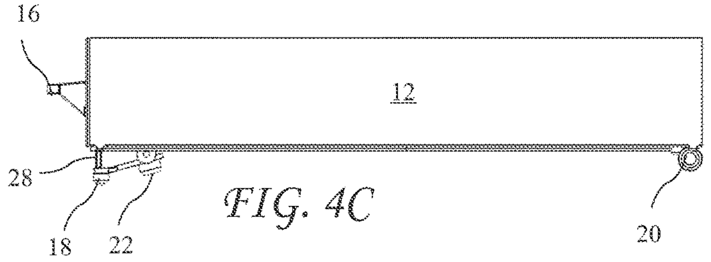
FIG. 4C shows a side view of the first coffee maker stand invention with the drawer closed, according to the present.

A top view of the stand 10 with the drawer 14 closed is shown in FIG. 4A, a front view of the stand 10 with the drawer 14 closed is shown in FIG. 4B, and a side view of the stand 10 with the drawer closed is shown in FIG. 4C. The handle 14 presses vertical arms 28 against a front edge of the roller assembly 26, pivoting the roller assembly 26 to lift the pads 22 causing the stand 10 to be supported by the rollers 18.

Figure 5A:
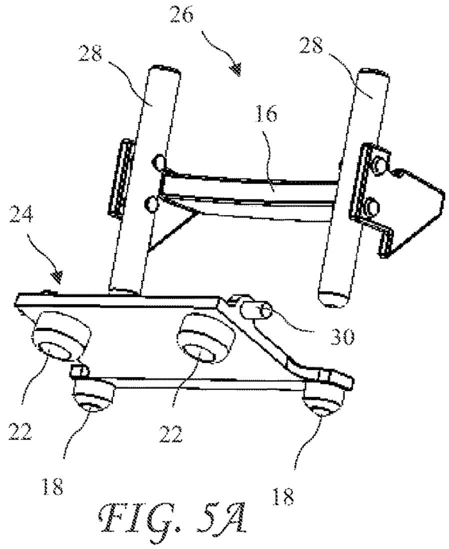
FIG. 5A shows a bottom perspective view of a handle assembly and a roller assembly according to the present invention.
Figure 5B:
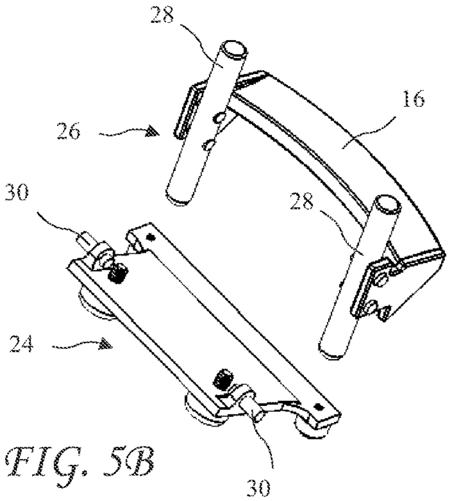
FIG. 5B shows a top perspective view of the handle assembly and the roller assembly according to the present invention.
Figure 6B:
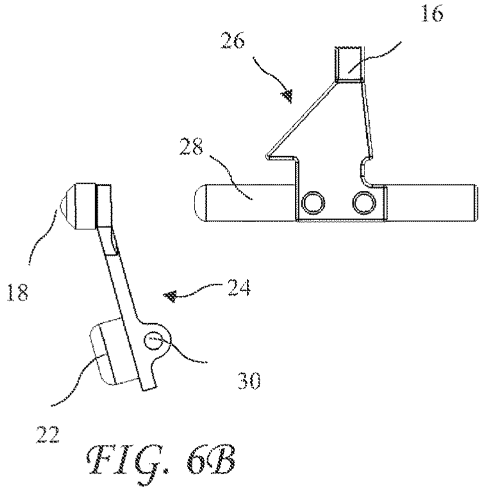
FIG. 6B shows a side view of the handle assembly and the roller assembly according to the present invention.
Figure 6A:
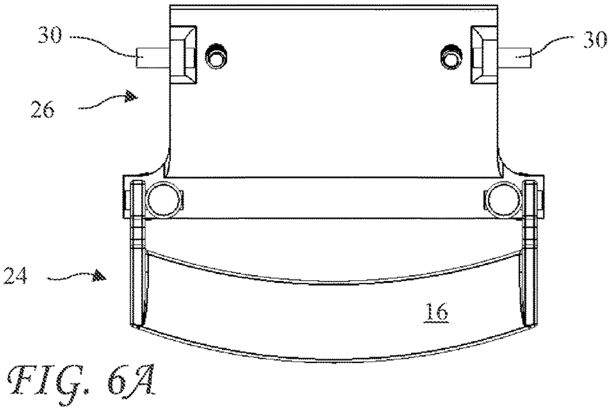
FIG. 6A shows a top view of the handle assembly and the roller assembly according to the present invention.
Figure 6C:
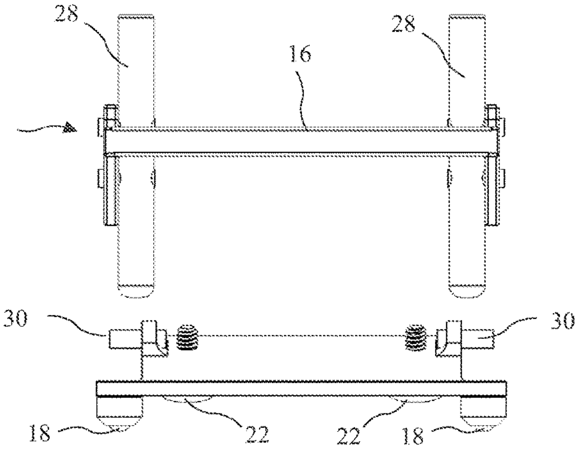
FIG. 6C shows a front view of the handle assembly and the roller assembly according to the present invention.

A bottom perspective view of a handle assembly 24 and roller assembly 26 is shown in FIG. 5A, a top perspective view of the handle assembly 24 and roller assembly 26 is shown in FIG. 5B, a top view of the handle assembly 24 and roller assembly 26 is shown in FIG. 6A, a side view of the handle assembly 24 and roller assembly 26 is shown in FIG. 6B, and a front view of the handle assembly 24 and roller assembly 26 is shown in FIG. 6C. The handle assembly 24 includes the handle 16 and the vertical arms 28. The vertical arms 28 are guided by passages 29 (see FIG. 3) in the drawer 14 to move vertically with the handle 16, and are aligned with the front of the roller assembly 26. The roller assembly 26 includes axles 30 rotatingly engaging the housing 12 to allow the roller assembly 26 to pivot to support the stand 10 by the rollers 22. The vertical arms 28 further pass through the passages 29 to lock the drawer 14 in the housing when the handle 16 is lowered. Thus, the stand 10 has two states: 1) where the handle 16 is lowered to lock the drawer 14 in the housing 12 and the stand 10 is supported by the rollers 18 and free to move; and 2) where the handle 16 is raised to free the drawer 14 and the housing 12 is supported by the pads 22 and restricted from movement.

Figure 7B:
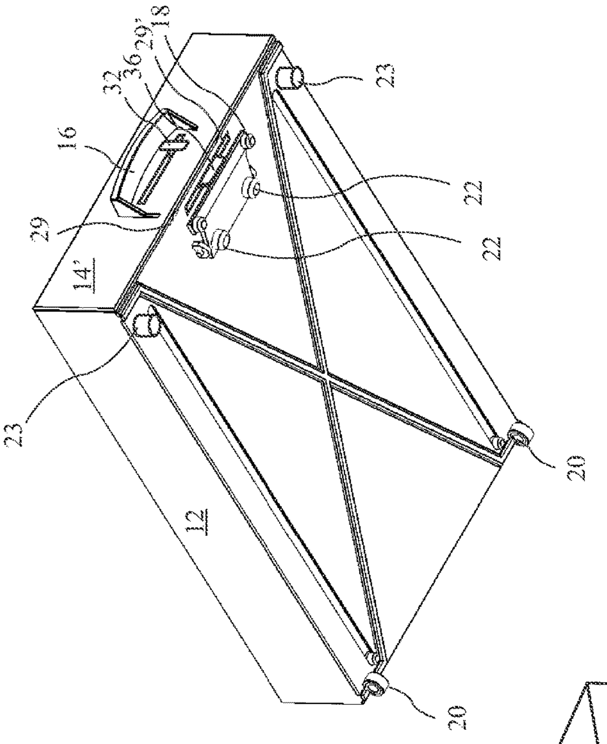
FIG. 7B shows a perspective bottom view of the second coffee maker stand with the drawer closed, according to the present invention.
Figure 7A:
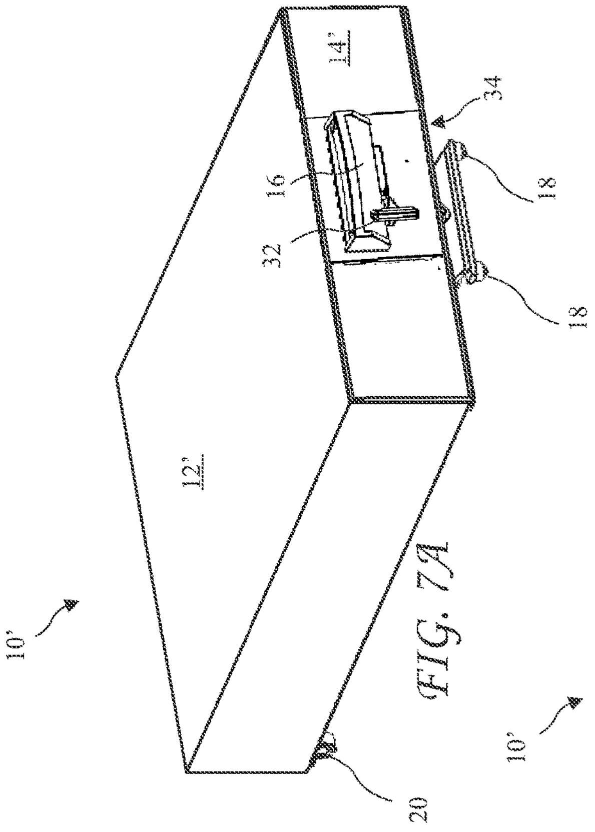
FIG. 7A shows a perspective top view of a second coffee maker stand with a drawer closed, according to the present invention.
Figure 8:
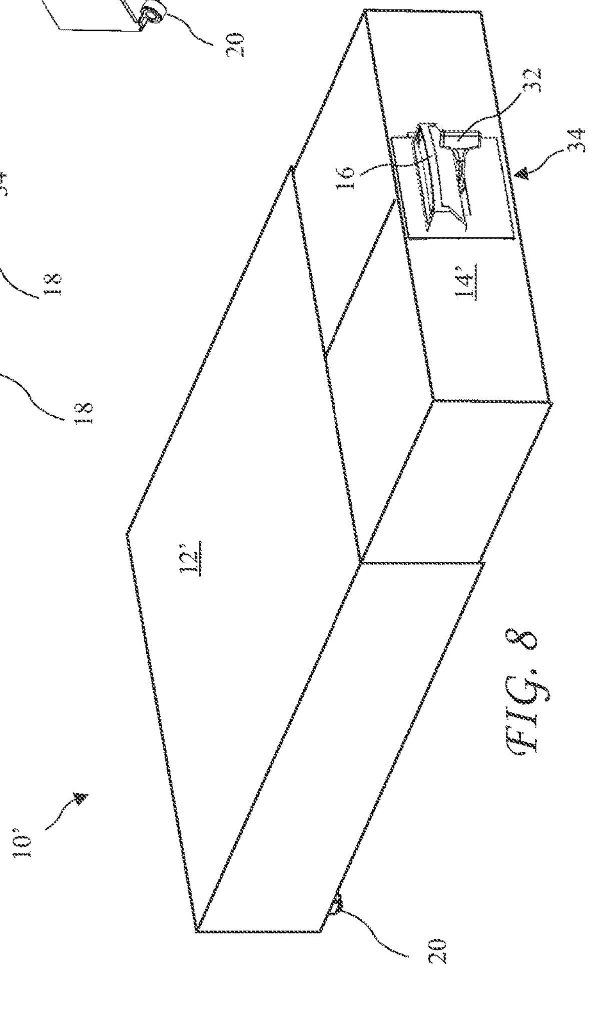
FIG. 8 shows a perspective view of the second coffee maker stand with the drawer open according to the present invention.

A perspective top view of a second coffee maker stand 10' with a drawer 14' closed is shown in FIG. 7A, a perspective bottom view of a second coffee maker stand 10' with a drawer 14' closed is shown in FIG. 7B, and a perspective view of the stand 10' with the drawer 14' open is shown in FIG. 8. The drawer 14' includes a fixed handle 16 and a horizontally moving lever 32. The lever 32 cooperates with the housing 12' roller assembly 26 to lock the drawer 14' and pivot the roller assembly 26. A cam 36 passes through a slot 29' in the housing 12' to lock the drawer.

Figure 9A:
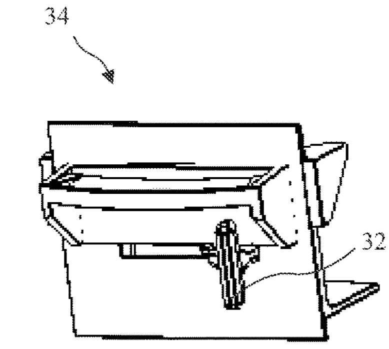
FIG. 9A shows a front view of a latch assembly of the second coffee maker stand with the latch unlocked according to the present invention.
Figure 9B:
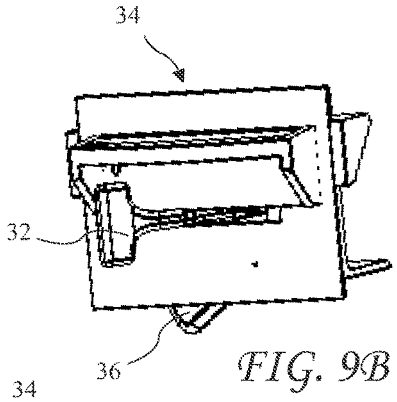
FIG. 9B shows a front view of the latch assembly of the second coffee maker stand with the latch locked according to the present invention.
Figure 10A:
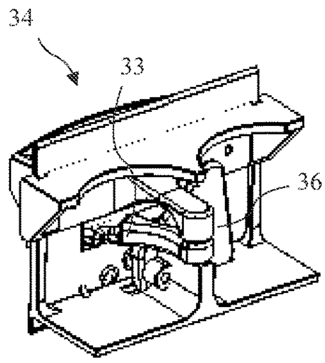
FIG. 10A shows a first rear view of the latch assembly of the second coffee maker stand with the latch unlocked according to the present invention.
Figure 10B:
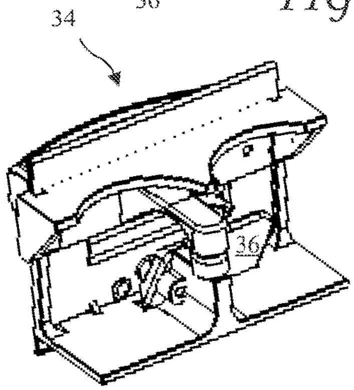
FIG. 10B shows a first rear view of the latch assembly of the second coffee maker stand with the latch locked according to the present invention.
Figure 11A:
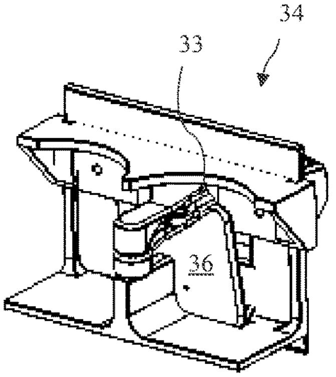
FIG. 11A shows a second rear view of the latch assembly of the second coffee maker stand with the latch unlocked according to the present invention.
Figure 11B:
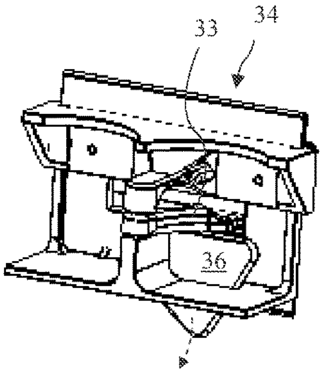
FIG. 11B shows a second rear view of the latch assembly of the second coffee maker stand with the latch locked according to the present invention.
Figure 12A:
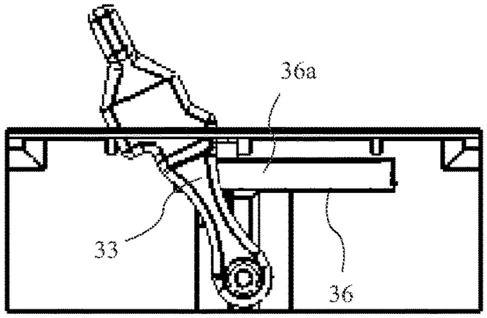
FIG. 12A shows a more detailed top view of the latch assembly of the second coffee maker stand with the latch unlocked according to the present invention.
Figure 12B:
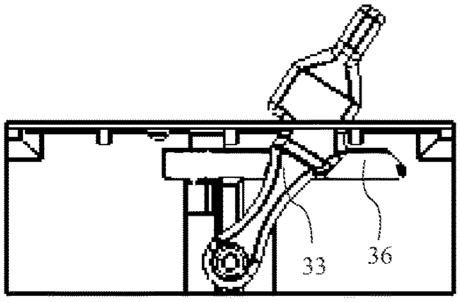
FIG. 12B shows a more detailed top view of the latch assembly of the second coffee maker stand with the latch locked according to the present invention.
Figure 13A:
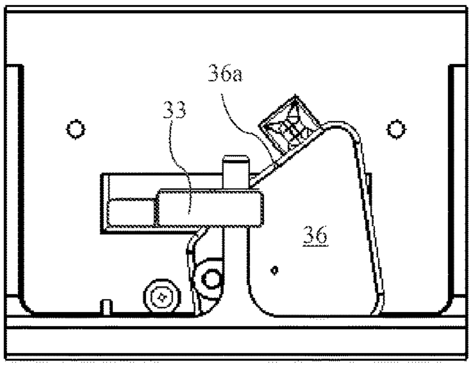
FIG. 13A shows a more detailed rear view of the latch assembly of the second coffee maker stand with the latch unlocked according to the present invention.
Figure 13B:
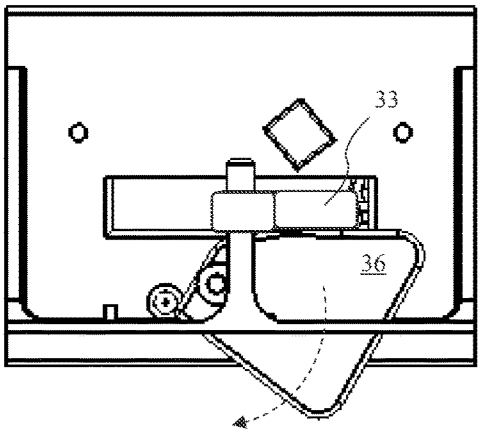
FIG. 13B shows a more detailed rear view of the latch assembly of the second coffee maker stand with the latch locked according to the present invention.

A front view of a latch assembly 34 of the stand 10' with the latch unlocked is shown in FIG. 9A and a front view of the latch assembly 34 with the latch locked is shown in FIG. 9B. A first rear view of the latch assembly 34 with the latch unlocked is shown in FIG. 10A, a first rear view of the latch 34 with the latch locked is shown in FIG. 10B, a second rear view of the latch assembly 34 with the latch unlocked is shown in FIG. 11A, and a second rear view of the latch assembly 34 with the latch locked is shown in FIG. 11B. A more detailed top view of the latch assembly 34 with the latch unlocked is shown in FIG. 12A, a more detailed top view of the latch assembly 34 with the latch locked is shown in FIG. 12B, a more detailed rear view of the latch assembly 34 with the latch unlocked is shown in FIG. 13A, and a more detailed rear view of the latch assembly 34 with the latch locked is shown in FIG. 13B. An interior portion 33 of the horizontally moving lever 32 pivots sides against a top surface 36*a* of the cam 36 to pivot the cam 36 when the horizontally moving lever 32 is moved laterally. The cam 36 pivots down and through the slot 29' (see FIG. 7B) in the housing 12' to lock the drawer and pivot the roller assembly 26 down.

While a latch is shown including a horizontally moving lever, those skilled in that art will recognize that a similar latch using a vertically move lever may similarly couple vertical motion of the lever with the cam to lock the drawer and pivot the roller assembly down, and any latch coupling the motion of a lever with a pivoting cam is intended to come within the scope of the present invention.

Figure 14A:
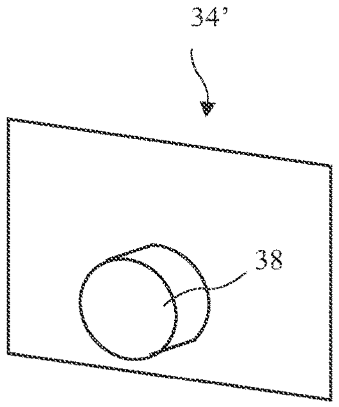
FIG. 14A shows a front perspective view of a second latch assembly have a rotatable round handle according to the present invention.
Figure 14B:
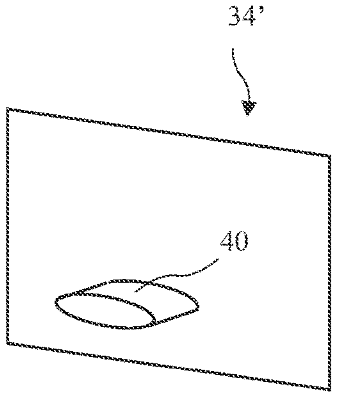
FIG. 14B shows a front perspective view of a second latch assembly have a rotatable flat handle according to the present invention.
Figure 15A:
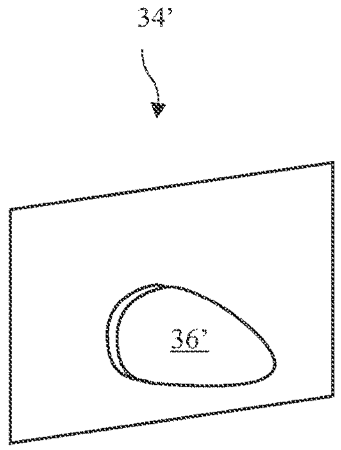
FIG. 15A shows a second cam of the second latch assembly in an unlocked position according to the present invention.
Figure 15B:
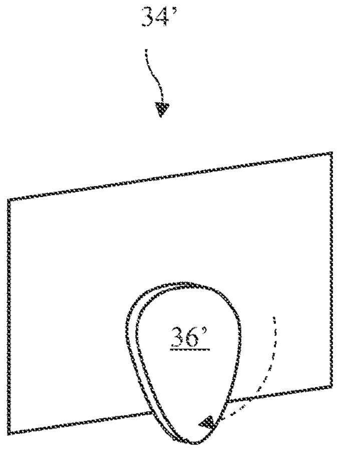
FIG. 15B shows the second cam of the second latch assembly in a locked position according to the present invention.

A front perspective view of a second latch assembly 34' have a rotatable round handle 38 is shown in FIG. 14A, a front perspective view of a second latch assembly 34' have a rotatable flat handle 40 is shown in FIG. 14B, a second cam 36' of the second latch assembly 34' in an unlocked position is shown in FIG. 15A, and the second cam 36' of the second latch assembly 34' in a locked position is shown in FIG. 15B. The handles 38 and 40 rotate the cam 36' directly, and a stand having the second latch assembly 34' is otherwise similar to the stand 10'.

While the invention herein disclosed has been described by means of specific embodiments and applications thereof, numerous modifications and variations could be made thereto by those skilled in the art without departing from the scope of the invention set forth in the claims.

I claim:

1. A coffee maker stand and drawer, comprising:

a housing having a housing top, housing sides, housing front, housing rear, and housing bottom;

rear rollers attached to the housing bottom proximal to the housing rear;

a roller assembly attached to the housing bottom proximal to the housing front, the roller assembly including at least one roller, the roller assembly pivotable from a first position to a second position;

a drawer residing in the housing and slideable out of the housing; and a horizontal actuator attached to the drawer, the actuator movable laterally to rotate a cam to rotate an increasing radius surface of the cam against the roller assembly to pivot the roller assembly to the second position to support the housing by the at least one roller.

2. The coffee maker stand and drawer of claim 1, wherein the actuator further cooperates with the housing to lock the drawer in a closed position.

3. The coffee maker stand and drawer of claim 2, wherein the actuator simultaneously locks the drawer in the closed position and moves the roller assembly to support the housing by the at least one roller.

4. The coffee maker stand and drawer of claim 1, wherein the rollers are ball rollers.

5. The coffee maker stand and drawer of claim 1, wherein the rear rollers are wheels.

6. The coffee maker stand and drawer of claim 1, wherein the rear rollers are casters.

7. The coffee maker stand and drawer of claim 1, further including feet extending down from the housing bottom at locations proximal to the housing front and housing sides, the feet configured to support the housing when the roller assembly is pivoted towards the housing.

8. The coffee maker stand and drawer of claim 1, wherein the at least one roller comprises two laterally spaced apart rollers.

9. The coffee maker stand and drawer of claim 1, wherein the two laterally spaced apart rollers are two ball rollers.

10. The coffee maker stand and drawer of claim 1, wherein:

the horizontal actuator includes an interior portion residing inside the drawer;

the cam includes a first position wherein a top surface resides generally diagonally sloping up and away from the interior portion of the horizontal actuator; and horizontal movement of the horizontal actuator urges the interior portion against the top surface of the cam and rotates the cam to move the increasing radius portion down against the roller assembly to pivot the roller assembly to the first position to support the housing by the at least one roller.

11. The coffee maker stand and drawer of claim 10, wherein the horizontal movement of the horizontal actuator urges the interior portion against the top surface of the cam and rotates the cam to move the increasing radius portion through a slot in the housing to lock the drawer in the housing.

12. The coffee maker stand and drawer of claim 11, wherein the cam has generally parallel sides and the increasing radius portion is generally straight and orthogonal to the sides, and the top surface is generally straight and is not parallel to either the side or the increasing radius portion.

13. A coffee maker stand and drawer, comprising:

a housing having a housing top, housing sides, housing front, housing rear, and housing bottom;

rear rollers attached to the housing bottom proximal to the housing rear and housing sides;

a roller assembly attached to the housing bottom proximal to the housing front, the roller assembly including at least one ball roller, the ball roller assembly pivotable to support the housing by the at least one ball roller;

feet extending down from the housing bottom at locations proximal to the housing front and housing sides, the feet configured to support the housing when the roller assembly is pivoted towards the housing;

a drawer residing in the housing and slideable out of the housing; and an actuator attached to the drawer and operatively cooperating with the roller assembly to simultaneously lock the drawer in the closed position and move the roller assembly to support the housing by the rollers.

14. The coffee maker stand and drawer of claim 13, wherein the actuator rotates a cam to engage a slot in the housing to lock the drawer in the closed position, and to rotate an increasing radius surface of the cam against the roller assembly to pivot the roller assembly down to support the housing by the at least one roller.

15. The coffee maker stand and drawer of claim 14 wherein the actuator moves laterally to rotate the cam.

16. The coffee maker stand and drawer of claim 13, wherein:

the actuator includes an interior portion residing inside the drawer and a lever portion outside the drawer;

a pivoting cam includes a first position wherein a top surface resides generally diagonally sloping up and away from the interior portion of the actuator, and an increasing radius portion opposite to the top surface; and horizontal movement of the lever portion of the actuator urges the interior portion of the actuator against the top surface of the cam and rotates the cam to move the increasing radius portion down against the roller assembly to pivot the roller assembly down to support the housing by the at least one roller and to engage a slot in the housing to lock the drawer in the housing.

17. A coffee maker stand and drawer, comprising:

a housing having a housing top, housing sides, housing front, housing rear, and housing bottom;

two laterally spaced apart rear rollers attached to the housing bottom proximal to the housing rear and proximal to the housing sides;

a roller assembly attached to the housing bottom proximal to the housing front, the roller assembly including two laterally spaced apart ball rollers, the roller assembly pivotable to support the housing by the ball rollers;

feet extending down from the housing bottom at locations proximal to the housing front and housing sides, the feet configured to support the housing when the roller assembly is pivoted towards the housing;

a drawer residing in the housing and slideable out of the housing; and a horizontal actuator attached to the drawer and operatively cooperating with the roller assembly to simultaneously lock the drawer in the closed position and pivot the roller assembly to support the housing by the rollers.

18. The coffee maker stand and drawer of claim 17, wherein the horizontal actuator rotates a cam to engage a slot in the housing to lock the drawer in the closed position, and to rotate an increasing radius surface of the cam against the roller assembly to pivot the roller assembly down to support the housing by the at least one roller.

19. The coffee maker stand and drawer of claim 18 wherein the horizontal actuator moves laterally to rotate the cam.

20. The coffee maker stand and drawer of claim 17, wherein:

the actuator includes an interior portion residing inside the drawer and a lever portion outside the drawer;

a pivoting cam includes a first position wherein a top surface resides generally diagonally sloping up and away from the interior portion of the horizontal actuator, and an increasing radius portion opposite to the top surface; and horizontal movement of the lever portion of the actuator urges the interior portion of the horizontal actuator against the top surface of the cam and rotates the cam to move the increasing radius portion down against the roller assembly to pivot the roller assembly down to support the housing by the at least one roller and to engage a slot in the housing to lock the drawer in the housing.

* * * * *